United States Patent [19]

Taylor

[11] 4,137,623

[45] Feb. 6, 1979

[54] METHOD AND APPARATUS FOR DISPENSING FLUID IN A CONDUIT

[75] Inventor: Philip W. Taylor, Burnet, Tex.

[73] Assignee: Taylor Industries, Inc., Marble Falls, Tex.

[21] Appl. No.: 894,565

[22] Filed: Apr. 7, 1978

[51] Int. Cl.² .................... B05C 7/08; B05D 1/28; B23P 19/04

[52] U.S. Cl. .................................. 29/433; 118/205; 118/DIG. 10; 184/15 R; 427/239

[58] Field of Search ............... 29/433, 424; 174/68 C; 118/205, 207, 214, DIG. 10, 215, 408; 184/15 R; 427/230, 231, 232, 234, 238, 239

[56] References Cited

U.S. PATENT DOCUMENTS

| 3,605,251 | 9/1971 | Salerno et al. | 29/433 |
| 3,605,947 | 9/1971 | Salerno et al. | 118/408 X |

Primary Examiner—Morris Kaplan
Attorney, Agent, or Firm—Hauke and Patalidis

[57] ABSTRACT

A method and apparatus for dispensing a fluid in a conduit and more particularly for dispensing lubricant within an electrical conduit for facilitating pulling electrical cables through the conduit. The apparatus is in the form of a cartridge disposed in the conduit at an end thereof. The cartridge is made of a pair of sealed and separable members. One of the members is a flanged sleeve forming the casing of the cartridge, in which is coaxially disposed the separable member forming a tubular support member or carrier for a mass of resilient and absorbent lubricant impregnated porous material compressibly packed between the inner surface of the sleeve casing and the carrier. A cable pulling strand, or fishtape, is passed through the tubular carrier, and the cables to be pulled through the conduit are attached to the end of the fishtape. A plug inserted in the open end of the tubular carrier prevents the fishtape and the cables attached thereto from being pulled back through the carrier. The carrier separates from the sleeve casing when a pull is exerted on the other end of the fishtape. The mass of resilient and absorbent material supported by the carrier expands to the inner diameter of the conduit when leaving the sleeve casing and absorbs part of an additional supply of lubricant contained in the cartridge. Pulling the lubricant-impregnated mass of resilient and absorbent material on the carrier ahead of the electrical cables coats the wall of the conduit with a film of lubricant.

12 Claims, 11 Drawing Figures

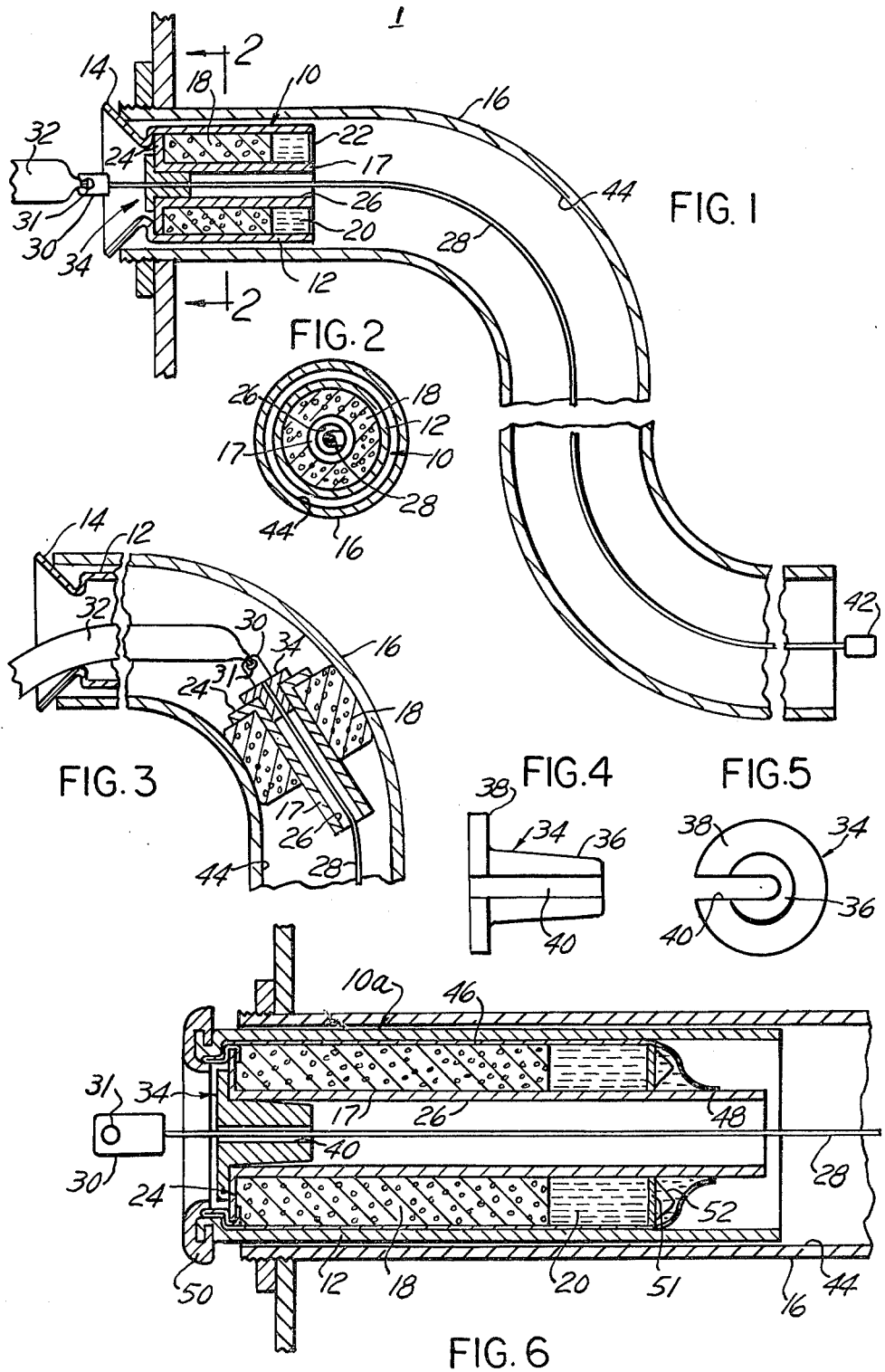

METHOD AND APPARATUS FOR DISPENSING FLUID IN A CONDUIT

BACKGROUND

The present invention relates to a method and means for dispensing a fluid within a pipe or conduit and more particularly for dispensing a lubricant for facilitating cable pulling and installation of electrical cables in an extended conduit.

Electrical wiring of buildings, and more particularly of commercial and industrial buildings, is generally effected by installing a plurality of conduits under the floors or above the ceilings and through the walls from end to end of the buildings, between an electrical inlet station and a plurality of distribution outlets and connection boxes. Electrical cables are installed in the empty conduits by first placing a flexible pull strand, or fishtape, by pushing it through a given length of conduit, from a connection box to another, or from one end of the conduit to the other. The electrical cable or cables to be pulled through the conduit are attached to an end of the fishtape, and the other end of the fishtape is manually, or mechanically, pulled such as to pull the electrical wires or cables from one end of the conduit to the other.

In installations where the conduit is relatively long, or where there are bends in the conduit, lubricant is applied to the surface of the electrical cables as they enter the conduit, in order to reduce as much as possible the friction between the electrical cable peripheral surface and the inner surface of the conduit wall. While one man pulls on the fishtape at one end of the conduit, another man smears a paste lubricant on the electrical cables entering the conduit at the other end or, in the alternative, wipes the electrical cables with a rag impregnated with lubricant or squirts lubricant on the cables. The electrical cables are very slippery, which prevents the man at the inlet of the conduit from helping by pushing the cables into the conduit, and the lubricated cables being inserted in the conduit accumulate dirt and grit from anything they touch. Furthermore, most of the lubricant coating the electrical cables is transferred to the conduit wall proximate to the inlet of the conduit, and very little lubricant remains on the surface of the cables where it is most needed at bends and further down the conduit.

Diverse attempts have been made in the past to overcome the inconveniences of manually lubricating electric cables prior to pulling through a conduit. For example, U.S. Pat. No. 3,605,947 discloses permanently installing rupturable containers of lubricant in an electrical conduit, at predetermined locations along a run of conduit. The containers are broken during installation of electrical cables, thus releasing the lubricant and reducing the friction between the cables and the conduit wall during pulling of the cables through the conduit. The inconveniences of such an arrangement are many, as it requires modifications of conventional electrical conduits, as lubricant is available only when electrical cables are first installed through a conduit, and as manual lubrication of electrical cables must be resorted to when additional cables are passed through the conduit at some later date.

U.S. Pat. No. 3,858,687 discloses low profile flexible rupturable lubricant containers attached at appropriate locations along an electrical cable being pulled through a conduit. The containers are ruptured by pressure when the cable is pulled through zones of heavy friction between the cable and the conduit wall, thus releasing the lubricant. Such lubricating system is complicated, and there is no assurance that lubricant will be provided where most needed, or that not all the lubricant will be exhausted prior to finishing pulling an electrical cable through a conduit.

U.S. Pat. No. 3,908,799 discloses an apparatus and method for pre-lubricating a conduit interior prior to inserting electrical cables therethrough. The lubricant is contained in tubing sections interconnected by rods. The tubing sections are provided with an aperture through which lubricant is dispensed by progressively squeezing the tubing sections by means of clamping loops forming part of the rods and by relatively displacing the tubing sections and the clamping loops. Such an arrangement requires that the conduit be empty so as to afford passage for the tubing sections containing the lubricant and the accompanying rods through the conduit. Application of lubricant through the conduit is somewhat haphazard and difficult to be effected.

U.S. Pat. No. 3,438,461 discloses a collapsible bag filled with lubricant which is attached between a fishtape and the end of the electrical cables being pulled through a conduit. The collapsible bag is filled with lubricant and is contained in a flexible sleeve, which is caused to extend as a function of the tension exerted on the fishtape so as to contract the sleeve peripherally and expel lubricant from the collapsible bag. Such an arrangement also presents the inconvenience of applying lubricant in a haphazard manner, and the lubricant applicator may be completely emptied right at the beginning of a run, such that very little lubricant, if any, is applied to the conduit walls towards the end of the run.

The disadvantages of the prior art are remedied by the present invention which provides a method and means for evenly applying lubricant all along the length of a conduit, which requires very little lubricant, which coats the conduit wall with lubricant where it is most needed, which does not leave an excess of lubricant in the conduit, which permits to lubricate electric cables and the like only after they have been introduced in the conduit, and then only as a result of engagement with the surface of the conduit wall, which is in the form of a sealed cartridge having its own supply of lubricant, and therefore avoiding contamination of lubricant remaining in an opened container, which, in addition to lubricating the wall of the conduit simultaneously with the installation of electrical cable therein, also cleans the wall free of dirt, and which provides a smooth low friction bearing remaining at the inlet of the conduit which prevents damaging contact between the electrical cable periphery and the sharp edge of the conduit end.

SUMMARY

The present invention accomplishes its many objects by providing a cartridge lubricator in the form of a sleeve casing containing a separable lubricant applicator in the form of a lubricant-impregnated resilient and absorbent mass of elastomeric or foamed material which is normally held under compression within the casing and which is capable of elastically expanding to the diameter of the conduit when severed from the casing. The applicator is disposed on a tubular substantially rigid carrier unit through which is passed the fishtape used for pulling electrical wires or cables through the conduit. The carrier unit thus mounted at the trailing end of the fishtape is pulled ahead of the electrical cable during installation of the cable in the conduit, automatically coating the inner wall of the conduit with a required amount of lubricant.

The many objects and advantages of the present invention will become apparent to those skilled in the art when the following description of alternate embodiments of the best mode contemplated for practicing the invention, given for illustrative purposes, is read in conjunction with the accompanying drawing, wherein:

BRIEF DESCRIPTION OF THE DRAWING

FIG. 1 is an illustration of an example of fluid or lubricant applicator cartridge according to the present invention disposed at the inlet of a conduit prior to pulling an electric cable through the conduit, shown in longitudinal section;

FIG. 2 is a cross-section thereof from line 2—2 of FIG. 1;

FIG. 3 is a partial schematic view illustrating the lubricant applicator of FIGS. 1-2 being pulled through a conduit;

FIGS. 4 and 5 are respectively a detailed longitudinal elevational view and end view of an example of plug for use with the invention for attaching a pull strand or fishtape thereto;

FIG. 6 is a longitudinal section through a modified lubricant applicator cartridge according to the present invention;

DETAILED DESCRIPTION OF THE PREFERRED EMBODIMENTS

Figure 7:
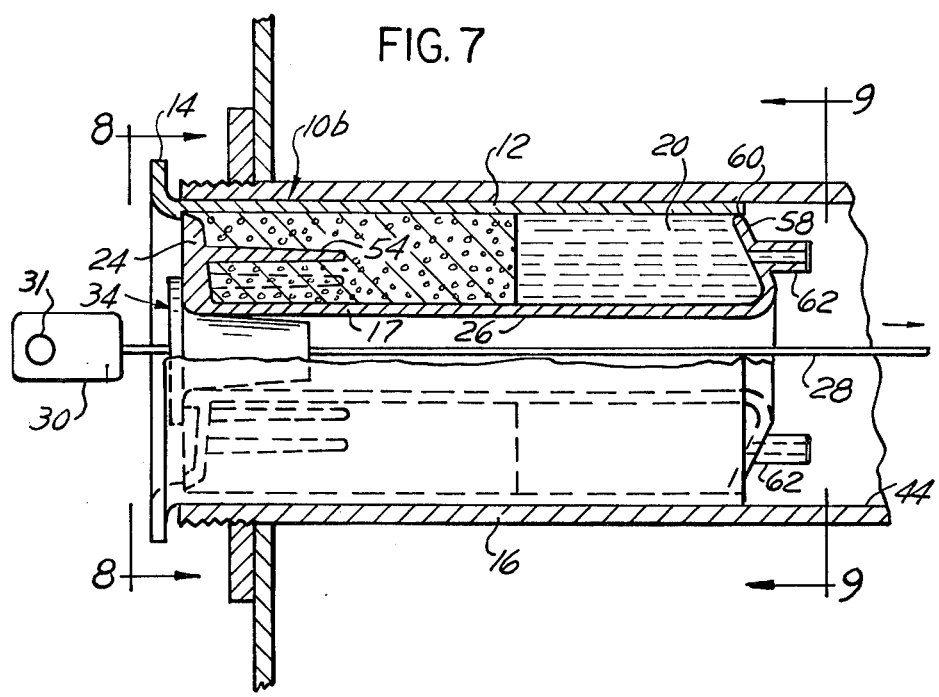
FIG. 7 illustrates partly in elevation and partly in longitudinal section another modification of the present invention.

Referring to the drawing, and more particularly to FIGS. 1-2 thereof, a conduit lubricant applicator cartridge 10, according to the present invention, comprises a casing in the form of a sleeve 12 provided with an integral flange 14 on one end, the flange 14 having a diameter slightly larger than the inner diameter of an electrical pipe or conduit 16 in the inlet of which the cartridge 10 is placed. The outer diameter of the sleeve casing 12 has a dimension permitting it to freely fit within the conduit 16. A rigid tubular carrier 17 supporting an annular core 18 of resilient and fluid absorbent cellular material is coaxially disposed within the sleeve casing 12. The annular core 18 is compressibly held and is made of soft open-cell sponge-like material, preferably a foam rubberlike or resilient synthetic foamed resin. A supply of liquid fluid, such as a liquid lubricant, is disposed, as shown at 20, in an annular space between the inner surface of the sleeve 12 and the outer surface of the carrier 17. A thin film diaphragm 22 seals the reserve 20 of lubricant from the ambient.

The tubular carrier 17 is provided at an end with an integral flanged end wall 24 engaging the corresponding end of the annular core 18. Both the tubular carrier 17 and the sleeve casing 12 are made of a material such as thin metal, cardboard or plastic, preferably plastic, and the edge of the carrier flanged end wall 24 engaging the inner surface of the sleeve casing 12 forms a seal therewith, either by slight press-fit or with a weak adhesive film placed between the engaged surfaces. The sealing diaphragm 22 is similarly attached to the outer surface of the carrier 17 and the inner surface of the sleeve 12 by means of adhesive, by heat or ultrasonic welding, or the like.

The tubular carrier 17 is provided with an internal bore 26 affording a passageway for a pull strand or fishtape 28 provided on its end with a tying tab 30. The tab 30 is provided with an aperture 31 for attachment to the tab 30 of the end of, for example, electric cables such as the electric cable 32 which it is desired to pull through the conduit 16. Prior to pulling the cable 32 through the conduit 16, the end of the fishtape 28 provided with the tab 30 is passed through the bore 26 of the tubular carrier 17, and a plug 34 is fitted in the end of the bore 26 to act as a retainer for the tab 30. As best shown at FIGS. 4-5, the plug 34 has a cylindrical, preferably tapered, body portion 36 provided on one end with an integral flange 38. The plug 34 is provided with a radial slot 40 extending from end to end of the plug body 36, permitting the fishtape 28 to pass freely therethrough, the depth of the slot 40 being preferably less than the width of the tab 30, when the plug 34 is fitted in position in the end of the bore 26, as shown at FIG. 1.

With the respective elements disposed as shown in FIG. 1, and with the cartridge 10 inserted, as shown, in the end of the conduit 16, a pull exerted on the end 42 of ths fishtape 28 is transmitted through the abutting surfaces of the tab 30 and the plug 34 to the carrier 17. The carrier 17 separates from the sleeve casing 12 which is retained in position by the outwardly projecting flange 14, the carrier 17 pulling with it the lubricant pre-impregnated annular core 18, supported by the carrier 17, the diaphragm 22 being torn off its anchoring surfaces. As soon as the annular core 18 is pulled from inside the sleeve casing 12 in which it is compressibly held, the annular core 18 expands to a diameter size completely filling the bore 44 of the conduit 16. During expansion, and while the lubricant pre-impregnated annular core 18 resumes its relatively relaxed original shape and diameter as limited, however, by the inner diameter of the conduit 16, part of the lubricant contained in the reserve 20 is absorbed by the annular core 18. Any surplus portion of the lubricant reserve 20 which escapes and drops on the wall 44 of the conduit 16 is pushed in front of the annular core 18 and progressively absorbed during the further travel of the annular core 18 through the conduit 16 while being pulled by the fishtape 28, as the annular core 18 progressively exhausts its own self-contained reserve of lubricant.

As illustrated at FIG. 3, the annular core 18 peripherally engages the wall 44 of the conduit 16, after leaving the sleeve casing 12, wipes the conduit wall 44 clean and automatically provides its surface with a thin film of lubricant. The resiliency of the material forming the annular core 18 permits it to peripherally conform to irregularities and bends in the conduit 16, and to adapt itself to any complex contour, all the time dispensing and leaving behind a thin film of lubricant on the surface of the conduit wall 44.

As best illustrated at FIG. 3, the sleeve casing 12 remaining in position at the inlet end of the conduit 16, together with the sleeve casing integral flange 14, forms a smooth bearing surface permitting the electric cable 32 to be easily pulled into the conduit 16 without any risk of gouging the insulating sleeve of the cable, or the insulation of individual wires when a bundle of wires is pulled through the conduit, as the sleeve casing 12 and its integral flange 14 prevent the cable 32 from contacting the conduit sharp edge.

Referring now to FIG. 6, there is shown in longitudinal section a lubricating cartridge 10a which is a modification of the lubricating cartridge 10 of FIGS. 1-2. The resilient absorbent annular core 18, in the embodiment of FIG. 6, and the additional lubricant supply 20 are encased in a thin plastic film pouch 46 which is sealed at one end 48 to the outer surface of the main body portion of the tubular carrier 17, and which is clamped at its other end between the conforming interlocking portions of a retainer ring 50 fastened to the end of the sleeve casing 12. The retainer ring 50 forms a flange of a larger diameter than the inner diameter of the pipe 16, such as to hold the sleeve casing 12 in position when the fishtape 28 is pulled, thus causing the carrier 17 to strip from within the sleeve casing 12. Proximate the leading edge of the thin film pouch 46, and in the space providing the lubricant reserve 20, there is disposed a plurality of radially disposed pins 51 fastened to the outer surface of the main body portion of the carrier 17, and each provided with a sharp triangular, or otherwise suitably shaped fin 52 for puncturing the thin film pouch 46 when the carrier 17 is pulled from within the sleeve casing 12. The puncturing fins 52 may be omitted to simplify the structure, if the junction of the end 48 of the pouch 46 with the surface of the carrier 17 is relatively weak.

The operation of the lubricating cartridge 10a of FIG. 6 is the same as the operation of the lubricating cartridge 10 of FIGS. 1-2. When the carrier 17 is pulled from within the sleeve casing 12, and when the resilient absorbent pre-lubricated annular core 18 fully expands to the diameter of the inner wall 44 of the conduit 16, the excess lubricant contained in the reserve 20 is absorbed by the cellular resilient annular core 18, with any further excess of lubricant being displaced in front of the leading edge of the annular core and being swabbed into a thin film coating the wall 44 of the conduit 16 as a result of the passage of the annular core 18 through the conduit 16 ahead of electrical cables being pulled by means of the fishtape 28.

In the structure of FIG. 6, the pouch 46 prevents, before use, leakage of the lubricant and contamination during transit and storage.

Figure 8:
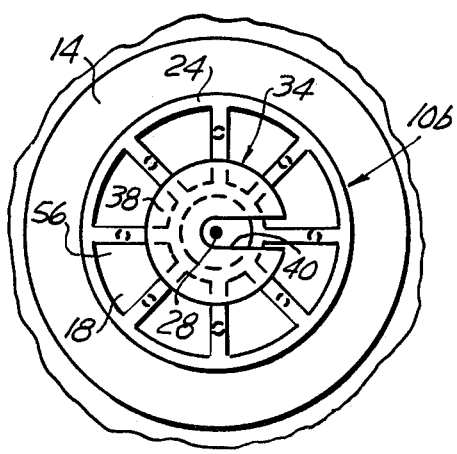
FIG. 8 is an end view thereof from line 8—8 of FIG. 7.
Figure 9:
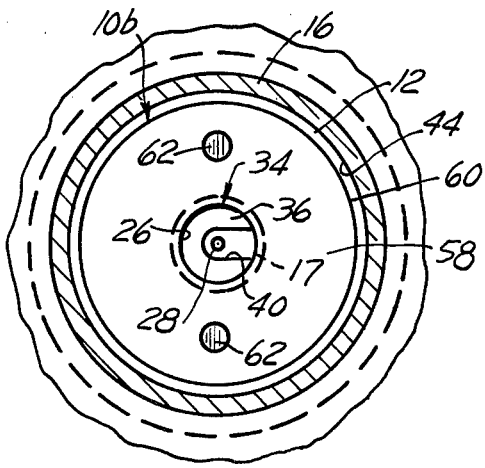
FIG. 9 is an end view thereof from line 9—9 of FIG. 7.

FIGS. 7-9 represent a further modification 10b of a conduit lubricating cartridge according to the present invention. The carrier 17 has its end wall 24 provided with a plurality of circularly disposed longitudinally projecting integral prongs 54 inserted in the mass of the cellular resilient absorbent annular core 18, and aiding in holding it in position when the carrier 17, together with the annular core 18, is stripped from within the sleeve casing 12. The end wall 24 of the carrier 17 may be imperforate or, in the alternative and as best shown at FIG. 8, it may be provided with a plurality of apertures 56, permitting an additional small amount of lubricant exhuding from the annular core 18 to be dropped behind the carrier 17 when pulled through the conduit 16.

The carrier 17 is provided with a forward end wall 58, formed integrally, having its edge 60 engaged with the inner surface of the sleeve casing 12 and attached thereto by means of an adhesive, or by heat or ultrasonic welding when the components are formed of a plastic material. The forward end wall 60 is provided with a pair of nipples 62, one of which is used as a filler inlet to fill the space between the forward wall 58 and the annular core 18 with a reserve of lubricant 20 during manufacture of the lubricating applicator cartridge 10b, while the other nipple 62 acts as an atmosphere evacuation outlet during filling. After filling, the two nipples 62 are heat closed, or plugged.

Figure 10:
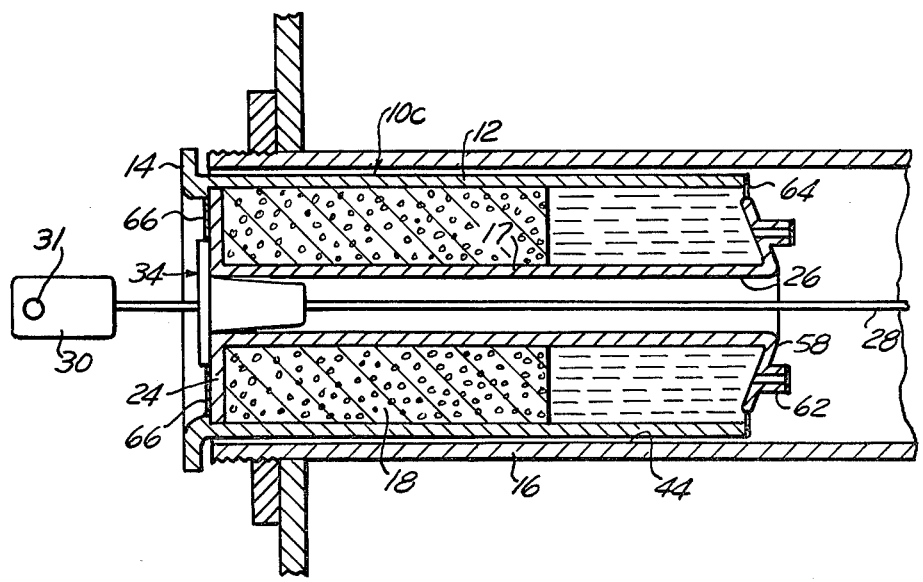
FIG. 10 is a longitudinal section through a further modification of lubricant applicator cartridge according to the present invention.

If it is desired to increase the shelf life of the lubricating cartridge 10b of FIGS. 7-9, a sealing thin film annular diaphragm may be adhered to the outer surface of the carrier perforate end wall 24, and peeled off prior to using the lubricant applicator cartridge or in the alternative the structure 10c represented at FIG. 10 may be used. The lubricant applicator cartridge 10c of FIG. 10 has an imperforate end wall 24 for the carrier 17, provided or not with prongs, not shown, for aiding in holding the annular core 18 in position around the carrier 17 while being pulled through the pipe or conduit 16. A thin film annular diaphragm 64 forms a seal from the ambient when adhesively attached between the carrier forward wall 58 and the forward edge of the sleeve casing 12, and a similar annular diaphragm 66 is adhesively placed across the junction between the rear wall 24 of the carrier 17 and the corresponding edge of the sleeve casing 12. Upon pulling the carrier 17 from within the sleeve casing 12, the diaphragms 64 and 66, made of thin film plastic material, are easily torn or peeled off.

It will be readily apparent to those skilled in the art that the carrier 17 may be made with a shape other than the hollow shape hereinbefore described and illustrated in the drawing. For example, the carrier may be provided at its forward end with appropriate means for attaching the end of a snake, pull strand or fishtape, and provided at its rear end with a tab for attaching the end of an electric cable or other elongated flexible object which it is desired to pull through a conduit.

It will also be readily apparent that instead of being impregnated with a lubricant fluid, the resilient absorbent annular core may be impregnated with a cleaning fluid, with a liquid chemical, or the like, to clean or treat the interior wall of a conduit, by being pulled through the conduit from one end to the other by means of an appropriate pulling strand.

Because of the high flexibility and resiliency afforded by the elastomeric cellular material, a fluid applicator, according to the present invention, conforms to different sizes of pipes or conduits and may be pulled through a conduit already partially occupied by cables and the like, while being capable of conforming to the shape of the surface of the conduit wall and to the shape of the surface of the cables, or other objects already present in the conduit, and leaving on such surfaces an appropriate film of lubricant, while pulling behind it additional cables.

It will also be appreciated that after a carrier with its accompanying annular core has been pulled within a conduit, the sleeve casing may be removed from the conduit inlet, and a new cartridge introduced into the inlet of the conduit, and by attaching the first carrier to the carrier of the second cartridge, and so on, a plurality of carriers, interconnected to each other, may be pulled through the conduit ahead of an electrical cable or the like.

Figure 11:
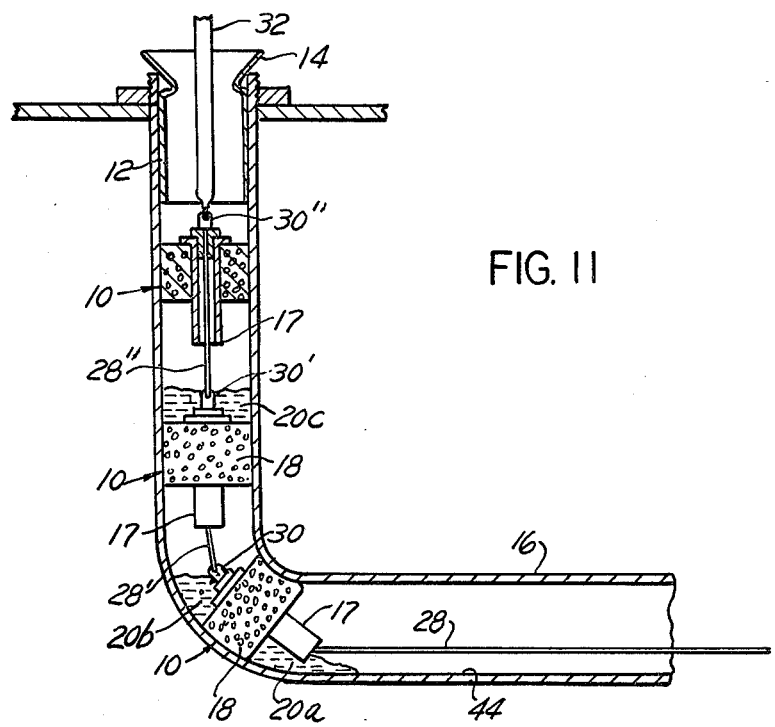
FIG. 11 is a schematic section through a length of conduit showing the use of a plurality of lubricant applicators according to the present invention.

Such an arrangement and method is schematically illustrated at FIG. 11, showing, for example, three consecutive carriers 17 each supporting a fluid impregnated resilient and absorbent cellular annular core 18 which are pulled all by means of a common pull strand or fishtape 28 through a conduit 16. The fishtape 28 is attached to the first annular core carrier 17, and its tab 30 has a short length of pull strand 28' provided with a tieing tab 30', pulling a second annular core carrier 17, which in turn pulls behind it a third annular core carrier 17 by means of a short pulling strand 28''. The electric cable 32 is attached to the tab 30'' of the short pull strand 28'' pulling the last annular core carrier 17, which is shown just emerging from its sleeve casing 12 placed at the inlet of the pipe 16.

FIG. 11 illustrates several advantages of the present invention. The bottom portion of FIG. 11 shows a horizontally disposed length of pipe 16, into which has fallen the excess supply 20a of fluid not absorbed by the first annular core 18 during expansion when pulled from its corresponding sleeve casing. It can be seen that the excess supply of fluid 20a, which may be a lubricant or a cleaning fluid, is pushed in front of the first annular core 18 when it is pulled through the pipe 16.

The second and the third annular cores 18 disposed around their respective carriers 17, are shown still positioned in a vertical section of the conduit 16. It can be seen that the excess supply of fluid 20b freed when the second annular core 18 and its supporting carrier 17 were pulled from their corresponding sleeve casing is trapped between the first and the second annular cores 18, while the excess supply of fluid 20c, contained in the third cartridge and freed when the third annular core 18 and its corresponding carrier 17 were pulled from their corresponding sleeve casing 12, it trapped between the second and third annular cores 18. It will be appreciated that, nevertheless, when the third annular core 18 is pulled through the conduit 16, whether the conduit 16, or a section thereof, is disposed horizontally, vertically, or at any angle, only an appropriate thin film of fluid, such as a lubricant, will remain behind, coating the wall 44 of the conduit 16 and preventing excessive friction between the conduit wall and the peripheral surface of the electrical cable 32 being pulled behind the last carrier 17 and annular core 18 assembly.

Having thus described the present invention by way of structural examples thereof, modifications whereof will be apparent to those skilled in the art, what is claimed as new is as follows:

1. An apparatus for dispensing a fluid in an extended conduit comprising a cartridge-like structure made of a pair of coaxial assembled separable inner and outer members disposed one within the other and insertable in an end of said conduit in a fixed position, means attaching the end of a pull strand to said inner member for separating said inner member from said outer member by pulling tension exerted by said pull strand, a resilient absorbent mass of cellular material supported by said inner member and normally compressibly held between said inner and outer member and capable when pulled from said outer member of expanding such as to be peripherally engaged with the wall of said conduit, means integral with the outer member adapted to retain said outer member in the conduit upon said separation, and a supply of said fluid associated within said structure and adapted to be applied to said conduit by said expanded cellular material when moved through said pull string.

2. The apparatus of claim 1 wherein said outer member is a sleeve casing having and said means integral is a flange portion of a diameter larger than the inner diameter of said conduit.

3. The apparatus of claim 1 wherein said cellular material is pre-impregnated with said fluid and further comprising an additional supply of fluid disposed such as to be partially absorbed by said cellular material during expansion thereof while being pulled from said outer member.

4. The apparatus of claim 1 wherein said mass of cellular material is in the form of an annular member supported by said inner member having an end flange engaging a side of said annular member.

5. The apparatus of claim 4 wherein said inner member is tubular and the end of said pull strand is passed through the bore of said tubular member, the end of said pull strand having means for attaching thereto an electrical cable and the like.

6. The apparatus of claim 5 wherein said means for attaching said pull strand comprises a slotted plug mounted in the end of said bore in said inner member.

7. The apparatus of claim 1 wherein said fluid is a lubricant.

8. A method for coating with a fluid the interior wall of an extended conduit, said method comprising fixedly placing in the end of said conduit a fluid applicator comprising a sleeve casing and a separable carriersupported mass of resilient fluid-absorbent and impregnated material in a partially compressed state, attaching the end of a pull strand to said carrier, and exerting a pull by means of said pull strand so as to separate said carrier and mass of fluid impregnated material as a unit from said sleeve casing and pull said mass of resilient material in an expanded state after leaving said sleeve casing through said conduit with the peripheral surface of said material in engagement with the wall surface of said conduit.

9. The method of claim 8 further comprising providing in said cartridge a reserve of said fluid, causing part of said fluid to be absorbed by said resilient material when passing from a compressed to an expanded state, and pushing in front of said mass of resilient material the unabsorbed portion of said fluid while pulling said material through said conduit.

10. The method of claim 9 wherein said fluid is a lubricant and further comprising attaching an electrical cable to said carrier for simultaneous pulling through said conduit behind said carrier.

11. The method of claim 9 further comprising removing said cartridge sleeve casing from the end of said conduit after pulling said carrier a distance within said conduit, placing a second cartridge fluid applicator at the end of said conduit, attaching the resilient material carrier of said second fluid applicator to said first carrier, and exerting an additional pull on said pull strand for pulling said second carrier behind said first carrier in said conduit.

12. The method of claim 11 wherein at least said second resilient material is impregnated with a lubricant.

* * * * *

UNITED STATES PATENT AND TRADEMARK OFFICE
CERTIFICATE OF CORRECTION

PATENT NO. : 4,137,623
DATED : February 6, 1979
INVENTOR(S) : Philip W. Taylor

It is certified that error appears in the above-identified patent and that said Letters Patent are hereby corrected as shown below:

Column 8, line 3, change "pull string" to -- conduit by said pull strand--.

line 5, delete "having".

Signed and Sealed this

Twenty-fourth Day of July 1979

[SEAL]

Attest:

Attesting Officer

LUTRELLE F. PARKER
Acting Commissioner of Patents and Trademarks